United States Patent
Takahashi et al.

(10) Patent No.: US 9,770,690 B2
(45) Date of Patent: Sep. 26, 2017

(54) EXHAUST GAS PROCESSING APPARATUS

(71) Applicant: FUJI ELECTRIC CO., LTD., Kawasaki-shi (JP)

(72) Inventors: Kuniyuki Takahashi, Hino (JP); Tadashi Komatsu, Tokyo (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 218 days.

(21) Appl. No.: 14/642,509

(22) Filed: Mar. 9, 2015

(65) Prior Publication Data
US 2015/0174527 A1    Jun. 25, 2015

Related U.S. Application Data (63) Continuation of application No. PCT/JP2013/083755, filed on Dec. 17, 2013.

(30) Foreign Application Priority Data

Dec. 19, 2012 (JP) ................................ 2012-276654

(51) Int. Cl.
*B01D 53/79* (2006.01)
*B05B 1/20* (2006.01)
(Continued)

(52) U.S. Cl.
CPC ........... *B01D 53/79* (2013.01); *B01D 53/504* (2013.01); *B01D 53/507* (2013.01); *B05B 1/202* (2013.01);
(Continued)

(58) Field of Classification Search
None
See application file for complete search history.

(56) References Cited

U.S. PATENT DOCUMENTS

| 4,308,039 A | 12/1981 | Djololian et al. |
| 5,474,597 A | 12/1995 | Halldin |

(Continued)

FOREIGN PATENT DOCUMENTS

| CN | 104053488 A | 9/2014 |
| JP | S50-105540 A | 8/1975 |

(Continued)

OTHER PUBLICATIONS

Translation of JP 2000176321 A, accessed Jan. 5, 2017.*
(Continued)

*Primary Examiner* — Amber R Orlando
*Assistant Examiner* — Phillip Shao
(74) *Attorney, Agent, or Firm* — Rabin & Berdo, P.C.

(57) ABSTRACT

There is provided an exhaust gas processing apparatus which improves the removal rate of harmful substances and also achieves a compact size. An exhaust gas processing apparatus (10) absorbing gas by creating contact between gas and liquid includes: an absorbing tower main body (11) in which an internal space is formed; a spray apparatus (12) which sprays liquid in a prescribed region in an up/down direction of the internal space; and a gas supply apparatus (13) which introduces gas into the absorbing tower main body (11), wherein the spray apparatus (12) includes: a trunk pipe (12b) which extends in the up/down direction in the prescribed region of the internal space; branch pipes (12c) which are connected to the trunk pipe (12b) and extend towards the inner wall of the absorbing tower main body (11); and spray nozzles (12d) which spray liquid supplied from the branch pipes (12c), wherein the spray nozzles (12d) are installed such that an angle formed between the center line of the spraying region of the spray nozzle (12d), and the lengthwise direction of the branch pipe (12c) is an acute angle.

20 Claims, 10 Drawing Sheets

(51) Int. Cl.
  *B05B 1/34*     (2006.01)
  *B01D 53/50*    (2006.01)
  *F01N 3/04*     (2006.01)
  *B01D 53/60*    (2006.01)
  *B01D 47/06*    (2006.01)

(52) U.S. Cl.
  CPC ............... *B05B 1/341* (2013.01); *F01N 3/04* (2013.01); *B01D 47/06* (2013.01); *B01D 53/60* (2013.01); *B01D 2247/101* (2013.01); *B01D 2251/30* (2013.01); *B01D 2252/1035* (2013.01); *B01D 2257/302* (2013.01); *B01D 2257/404* (2013.01); *B01D 2258/0283* (2013.01); *F01N 2570/04* (2013.01); *F01N 2590/02* (2013.01); *Y02T 10/20* (2013.01)

(56) References Cited

U.S. PATENT DOCUMENTS

| | | | | |
|---|---|---|---|---|
| 2008/0174032 | A1* | 7/2008 | Murata | B01D 47/06 261/76 |
| 2010/0116140 | A1* | 5/2010 | Arai | B01D 47/06 96/252 |
| 2013/0020730 | A1* | 1/2013 | Muramoto | B01D 3/008 261/116 |
| 2014/0338532 | A1 | 11/2014 | Sogaard | |

FOREIGN PATENT DOCUMENTS

| | | | |
|---|---|---|---|
| JP | S57-007528 | B2 | 2/1982 |
| JP | S62-71516 | A | 4/1987 |
| JP | S62-75828 | U | 5/1987 |
| JP | S63-156362 | U | 10/1987 |
| JP | H07-504614 | A | 5/1995 |
| JP | H07-171441 | A | 7/1995 |
| JP | 09038452 | A * | 2/1997 |
| JP | H09-038452 | A | 2/1997 |
| JP | H09-049627 | A | 2/1997 |
| JP | H11-239715 | A | 9/1999 |
| JP | 2000-176321 | A | 6/2000 |
| JP | 2000176321 | A * | 6/2000 |
| JP | 2000-210532 | A | 8/2000 |
| JP | 2000-210533 | A | 8/2000 |
| JP | 3073972 | B | 8/2000 |
| JP | 2000210532 | A * | 8/2000 |
| JP | 2008-200621 | A | 9/2008 |
| JP | 2010-179270 | A | 8/2010 |
| JP | 2012-192361 | A | 10/2012 |
| WO | WO 2013-107816 | A1 | 7/2013 |

OTHER PUBLICATIONS

Translation of JP 2000210532 A, accessed Jan. 5, 2017.*
Translation of JP 09038452 A, accessed Jan. 5, 2017.*
Extended European Search Report dated Jul. 17, 2015.
Office Action dated Jul. 15, 2016 for corresponding Chinese Application No. 201380046616.6.
Japanese Office Action with translation dated Mar. 1, 2016.

* cited by examiner

RELATIONSHIP BETWEEN DIAMETER PASSING
FOREIGN SUBSTANCE AND MEAN PARTICLE SIZE

FIG.7B

RELATIONSHIP BETWEEN DIAMETER PASSING
FOREIGN SUBSTANCE AND FLOW RATE

FIG.8

RELATIONSHIP BETWEEN SPRAY PRESSURE AND
MEAN PARTICLE SIZE

FIG.9

RELATIONSHIP BETWEEN TYPE OF
NOZZLE AND SOx REMOVAL RATE

FIG.10

EXHAUST GAS PROCESSING APPARATUS

CROSS-REFERENCE TO RELATED APPLICATIONS

This application is a continuation of international application PCT/JP2013/083755, filed on Dec. 17, 2013. The disclosures of this earlier application is incorporated herein by reference.

TECHNICAL FIELD

The present invention relates to an exhaust gas processing apparatus for removing harmful substances (principally, sulfur oxides ($SO_x$)) from exhaust gas.

BACKGROUND ART

An exhaust gas processing apparatus using a cyclone scrubber is known as a removal apparatus for removing $SO_x$ from exhaust gas (see, for example, Patent Document 1). The exhaust smoke desulfurization apparatus described in Patent Document 1 brings the gas that revolves up from the bottom of a cylindrical tower, into contact with liquid sprayed in the radial direction of the tower from spray nozzles installed at suitable intervals apart on a spray pipe installed vertically on the central axis of the tower, and absorbs or collects dirt.

In Patent Document 1, the spray nozzles are disposed so as to be directed in the same direction of rotation as the gas flow (rotating flow) which rises up while rotating from the bottom of the absorbing column, and are arranged so as to have an inclination with respect to the horizontal plane in order to spray the absorbing liquid upwards with respect to the horizontal direction. The spray mist emitted from the spray nozzles is sprayed in a substantially conical shape from a horizontal direction to an upward direction, for example.

Patent Document 1: Japanese Patent No. 3073972

DISCLOSURE OF THE INVENTION

Figure 10:
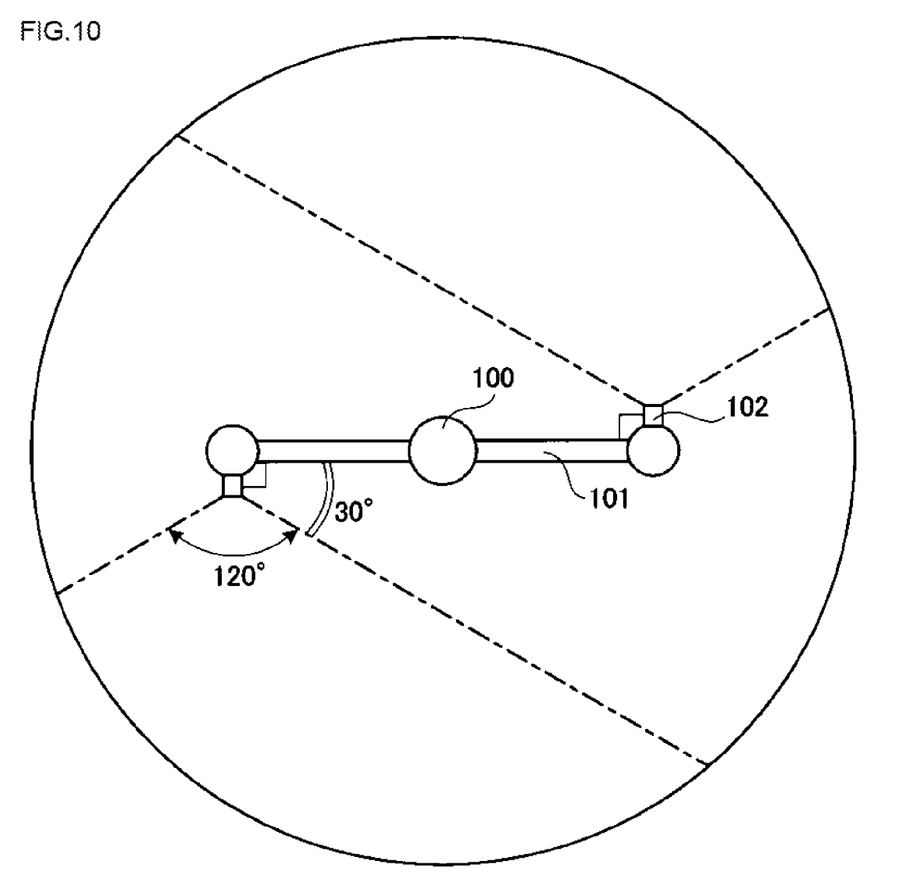
FIG. 10 is an illustrative diagrams showing a relationship between a branch pipe and a spray nozzle in a spray apparatus of the gas absorbing tower.

However, in the abovementioned exhaust smoke desulfurization apparatus, the angle of installation of the spray nozzles in the horizontal plane is not mentioned. Normally, as shown in FIG. 10, spray nozzles 102 are connected to a branch pipe 101 of the spray pipe 100 via an elbow having a bend section of 90 degrees, and therefore the spray nozzles 102 are disposed perpendicularly with respect to the branch pipe 101. In this case, if a fan-shaped spray pattern is adopted for the spray nozzles 102, then since the spray angle is 120 degrees at the broadest, the absorbing liquid is not sprayed in at least 30 degrees of the central direction. Furthermore, since the distance between the circumferential wall of the branch pipe 101 on the extending direction side, and the spray port of the spray nozzle 102 is short, then the distance of flight of the absorbing liquid sprayed in this portion is also short.

The removal rate when removing harmful substances in the exhaust gas by a cyclone scrubber is correlated to the contact properties between the exhaust gas and the absorbing liquid (principally, the contact surface area and the contact time). Consequently, sufficient contact surface area is not achieved when the droplets of the absorbing liquid sprayed from the spray nozzles are not dispersed in a broad range, and furthermore, sufficient contact time is not achieved when the flight distance is short, and hence there is a problem in that a high removal rate cannot be obtained. In this case, in order to obtain a desired removal rate, it is necessary to ensure contact properties by increasing the number of spray nozzles, and increase in the size of the cyclone scrubber cannot be avoided.

The present invention was devised in view of these circumstances, an object thereof being to provide an exhaust gas processing apparatus whereby the removal rate of harmful substances can be improved and compact size can be achieved.

The present invention is an exhaust gas processing apparatus absorbing gas by creating contact between gas and liquid, the apparatus including: an absorbing tower main body in which an internal space is formed; spray apparatus which sprays liquid in a prescribed region in an up/down direction of the internal space; and a gas supply apparatus which introducing gas into the absorbing tower main body, wherein the spray apparatus has: a trunk pipe extending in the up/down direction in a prescribed region of the internal space; branch pipes coupled to the trunk pipe and extending towards an inner wall of the absorbing tower main body; and spray nozzles spraying liquid supplied from the branch pipes; and the spray nozzles are installed such that an angle formed between the center line of the spray region of the spray nozzles and the lengthwise direction of the branch pipes is an acute angle.

According to the exhaust gas processing apparatus, since the spray nozzles are installed in such a manner that the angle formed between the center line of the spraying region of the spray nozzles and the lengthwise direction of the branch pipes is an acute angle, then it is possible to lengthen the distance between the perimeter wall section of the absorbing tower main body and the spray ports of the spray nozzles. Therefore, it is possible to increase the contact surface area between the exhaust gas and the absorbing liquid, since the droplets are sprayed in a broad range including the central portion, in the horizontal cross-section of the absorbing tower main body. Furthermore, by lengthening the distance between the perimeter wall section of the absorbing tower main body and the spray ports of the spray nozzles, the flight distance of the droplets is extended, and the contact time between the exhaust gas and the absorbing liquid can be increased.

In this way, the contact properties between the exhaust gas and the absorbing liquid (principally, the contact surface area and the contact time) can be raised, and therefore the efficiency of the removal of harmful substrates by each spray nozzle is raised, and the number of spray nozzles that need to be provided in order to achieve the desired removal rate in the gas processing apparatus is reduced. Since the number of branch pipes that need to be installed on the trunk pipe becomes lower, as the number of installed spray nozzles is reduced, then it is possible to shorten the trunk pipe. Consequently, it is possible to restrict the height of the absorbing tower main body for accommodating the water conduit pipe, and therefore it is possible to make the accommodating tower main body compact in size.

In the exhaust gas processing apparatus described above, desirably, the spray nozzles have an angle of installation by which the trunk pipe is not included within the spraying region.

Furthermore, in the exhaust gas processing apparatus described above, a plurality of the spray nozzles may be provided on each branch pipe, and the angle of installation of at least one of the spray nozzles may be an acute angle.

Moreover, in the exhaust gas processing apparatus described above, the angle of installation, with respect to the branch pipe, of the spray nozzle provided on the outer side in the radial direction may be smaller than the angle of installation of the spray nozzle provided in the inner side in the radial direction.

Moreover, in the exhaust gas processing apparatus described above, the spray nozzle may be a hollow cone nozzle. Beneficial Effects of the Invention.

According to the present invention, the removal rate of harmful substances is improved and a compact size can be achieved, in an exhaust gas processing apparatus.

BEST MODE FOR CARRYING OUT THE INVENTION

Figure 1:
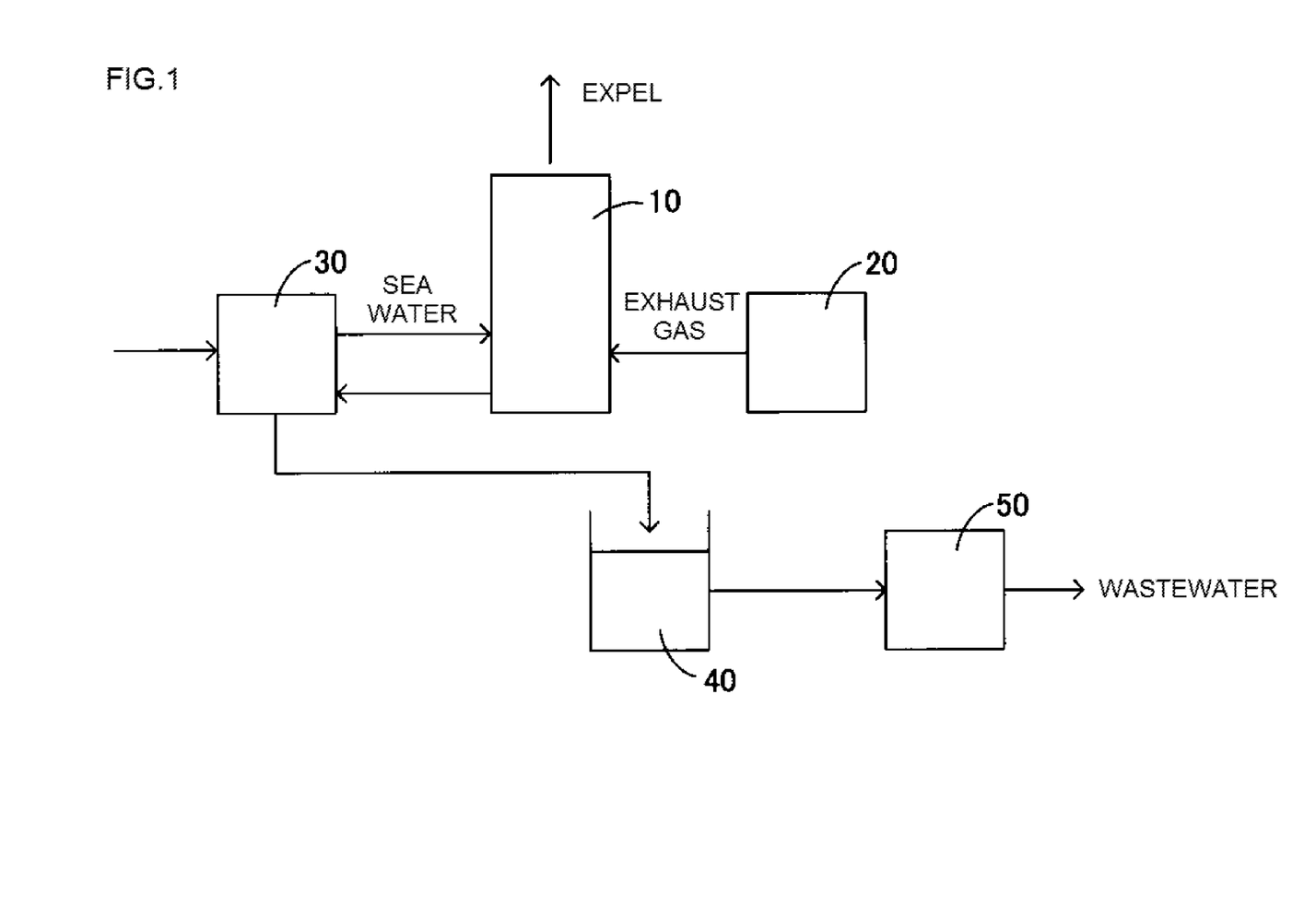
FIG. 1 is a schematic diagram showing an exhaust gas processing system centered on a gas absorbing tower relating to an embodiment of the present invention.

Below, embodiments of the present invention are described in detail with reference to the accompanying drawings. FIG. 1 is a schematic drawing showing an exhaust gas processing system centered on a gas absorbing tower which forms an exhaust gas processing apparatus relating to the present embodiment. The exhaust gas processing system relating to the present embodiment contemplates a system which removes sulfur dioxide ($SO_2$) included in exhaust gas emitted from an engine which is used in a ship to purify the exhaust gas. The invention is not limited to this, however, and the exhaust gas processing system relating to the present embodiment can be applied to processing of various exhaust gases including substances such as nitrogen oxide, sulfur oxide, and the like.

As shown in FIG. 1, the exhaust gas processing system is principally composed by a gas absorbing tower 10 which receives a supply of exhaust gas from the engine 20, a seawater pump unit 30 provided with a seawater pressurization pump and a seawater suction pump, a wastewater tank 40, and a filter unit 50 for filtering the wastewater.

The exhaust gas emitted from the engine 20 is introduced into the gas absorbing tower 10. This exhaust gas contains 50 to 1500 ppm of sulfur dioxide ($SO_2$). As this exhaust gas rises up inside the gas absorbing tower 10, seawater that has been introduced into the gas absorbing tower 10 is introduced via the seawater pump unit 30, and a gas liquid contact is created.

The sulfur dioxide in the exhaust gas is absorbed and removed by the seawater, which is alkaline, as indicated in Formulas (1) and (2) given below.

$$SO_2+H_2O \rightarrow H_2SO_3 \tag{1}$$

$$H_2SO_2+2AOH \rightarrow A_2SO_3+2H_2O \tag{2}$$

In the Formulas (1) and (2) above, A represents alkaline.

The exhaust gas from which the sulfur dioxide has been removed in this way is expelled into the atmosphere from the top of the gas absorbing tower 10.

The seawater sprayed inside the gas absorbing tower 10 drops down under gravity along the inner circumferential surface of the gas absorbing tower 10, and collects in a collecting section below the gas absorbing tower 10. The collected seawater is expelled to the wastewater tank 40 via the wastewater pump unit 30, and is then filtered by the filter unit 50 and discharged into the sea.

Figure 2A:
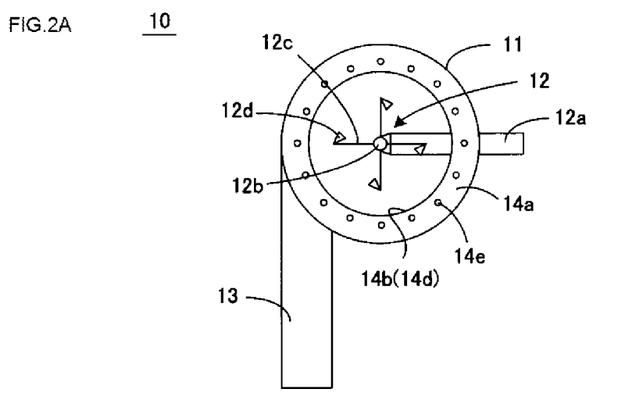
FIG. 2A is an upper surface schematic drawing of the gas absorbing tower and FIG. 2B is a cross-sectional schematic drawing of the gas absorbing tower.

Next, a concrete description of the gas absorbing tower 10 which is an exhaust gas processing apparatus relating to the present embodiment will be given. FIG. 2A is an upper surface schematic drawing of the gas absorbing tower 10 relating to the present embodiment, and FIG. 2B is cross-sectional schematic drawing of the gas absorbing tower 10.

Figure 2B:
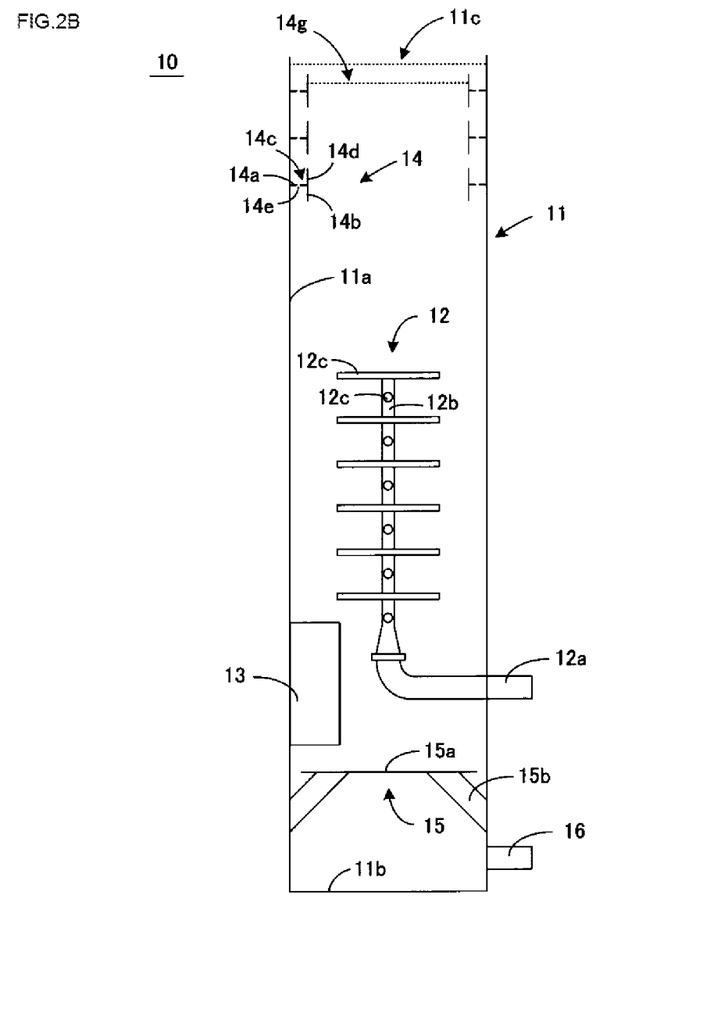

As shown in FIGS. 2A and 2B, the gas absorbing tower 10 is provided with: an absorbing tower main body 11 in which an internal space is formed in the up/down direction; a spray apparatus 12 which sprays liquid in the form of a mist in a prescribed region, in the up/down direction, of the internal space of the absorbing tower main body 11; a gas supply apparatus 13 which introduces gas into the absorbing tower main body 11 from a position below the region where the spray apparatus 12 sprays liquid; liquid return members 14 which are provided in a position above the region where the spray apparatus 12 sprays liquid, which projects in a ring shape towards the central axis from the inner wall surface of the absorbing tower main body 11, and of which at least the front end on the central axis side is bent back downwards; and a baffle 15 which is provided at a position below the spray apparatus 12. Here, the spray apparatus 12 is connected to the seawater pump unit 30 shown in FIG. 1, and the gas supply apparatus 13 is connected to the engine 20 shown in FIG. 1.

The absorbing tower main body 11 is constituted by a round cylindrical perimeter wall section 11a and a circular bottom wall section 11b. The perimeter wall section 11a is formed with the same diameter in all parts. The upper end portion of the perimeter wall section 11a is open and an opening section 11c is formed therein. In the present embodiment, the absorbing tower main body 11 has a round cylindrical shape, but the shape of the absorbing tower main body 11 is not limited to this and may be a square cylinder shape, for example.

The spray apparatus 12 is disposed on the central axis of the absorbing tower main body 11. The spray apparatus 12 is constituted by a water supply pipe 12a which is inserted inside the absorbing tower main body 11 from outside the absorbing tower main body 11 and which extends to a central position of the absorbing tower main body 11, a water conduit pipe 12b forming a trunk pipe which is coupled to the inserted end portion of the water supply pipe 12a and extends to a prescribed region, in the up/down direction, of the internal space of the absorbing tower main body 11, branch pipes 12c which are coupled to the water conduit pipe 12b and extend toward the perimeter wall section 11a of the absorbing tower main body 11, and spray nozzles 12d which are provided respectively at the front end of the each branch pipes 12c and which spray liquid supplied from the branch pipes 12c in a prescribed region. As described in detail hereinafter, these spray nozzles 12d are each installed in such a manner that an acute angle is formed between the center line of the spray region of the spray nozzle 12d, and the lengthwise direction or longitudinal axis of the branch pipe 12c.

The branch pipes 12c which are disposed in a plurality of levels in the up/down direction are arranged so that branch pipes 12c that are mutually adjacent in the up/down direction intersect with each other. The arrangement of the branch pipes 12c with respect to the water conduit pipe 12b is not limited to this; for example, a composition may be adopted in which four branch pipes 12c are arranged at 90 degree intervals apart on the same perimeter portion of the water conduit pipe 12b. Furthermore, the material of the spray nozzles 12d is desirably an austenite type stainless steel material, in order to obtain corrosion resistance when seawater is used as the absorbing liquid.

The gas supply apparatus 13 is provided in such a manner that the gas output direction is aligned with the tangential direction of the perimeter wall section 11a of the absorbing tower main body 11. Consequently, the exhaust gas introduced from the gas supply apparatus 13 is sprayed in a horizontal direction along the inner circumferential surface of the perimeter wall section 11a.

The liquid return members 14 each have a bend-back surface section 14a which projects in a ring shape towards the central axis from the perimeter wall section 11a of the absorbing tower main body 11, a bend-back piece 14b which is bent back downwards from the front end of the central axis side of the bend-back surface section 14a, a liquid reservoir wall 14d which projects to the upper side from the front end of the bend-back surface section 14a so as to create a liquid reservoir section 14c, and a through hole 14e which allows the liquid collected in the liquid reservoir section 14c to drop down.

The region on the central axis side which is surrounded by the bend-back pieces 14b and the liquid reservoir walls 14d of the liquid return members 14 attached to the absorbing tower main body 11 constitutes an opening section 14g (see FIG. 2B). This opening section 14g is composed so as to have an internal diameter of approximately 5 to 8 tenths that of the opening section 11c of the absorbing tower main body 11. By this composition, it is possible to suppress pressure loss caused by installing the liquid return members 14 on the absorbing tower main body 11.

The baffle 15 is constituted by a circular disk section 15a, and leg sections 15b which couple the circular disk section 15a with the perimeter wall section 11a of the absorbing tower main body 11. A gap for liquid droplets to flow through is formed between the outer circumferential portion of the circular disk section 15a and the perimeter wall section 11a of the absorbing tower main body 11. The baffle 15 divides the interior of the absorbing tower main body 11 into a region where liquid is sprayed by the spray apparatus 12 and a region where liquid is collected for drainage to the outside of the absorbing tower main body 11. A wastewater pipe 16 for discharging liquid to outside the absorbing tower main body 11 is provided below the baffle 15.

The exhaust gas processing in the gas absorbing tower 10 which is composed in this way will now be described. Exhaust gas discharged from an engine is introduced by the gas supply apparatus 13 at a position below the region where the spray apparatus 12 sprays liquid. This exhaust gas rises up inside the absorbing tower main body 11 while revolving so as to follow the perimeter wall section 11a.

Meanwhile, seawater is introduced into the water conduit pipe 12b via the water supply pipe 12a. The seawater is then sprayed towards the perimeter wall section 11a of the absorbing tower main body 11, from the spray nozzles 12d which are provided on the plurality of levels of branch pipes 12c.

Consequently, the exhaust gas which rises up while revolving inside the absorbing tower main body 11 makes gas/liquid contact with the seawater sprayed from the spray nozzles 12d provided on the branch pipes 12c which are provided in the respective levels, and the sulfur dioxide in the exhaust gas is absorbed and removed. The exhaust gas from which the sulfur dioxide has been removed is discharged into the atmosphere from the opening section 11c provided in the upper portion of the absorbing tower main body 11.

The seawater which forms into liquid droplets is pressed against the perimeter wall section 11a by the centrifugal force of the revolving flow and falls under its own weight. However, a portion of the seawater rises up through the interior of the absorbing tower main body 11 due to the rising and revolving flow.

In the central portion of the absorbing tower main body 11, the gas flow rate is 0 m/s or a value to close to same, and since the gas flow rate is faster in the vicinity of the perimeter wall section 11a than in the central portion, the seawater rises up along the perimeter wall section 11a due to the centrifugal force. The seawater which rises up along the perimeter wall section 11a is impeded from rising further by the lowermost liquid return member 14, and collects on the lower surface of the bend-back surface section 14a and the periphery of the bend-back piece 14b. When the collected liquid exceeds a certain amount, the liquid forms droplets and drops down under its own weight.

However, a portion of the seawater passes up over the bend-back piece 14b rather than turning into liquid droplets, and due to the centrifugal force, rises up along the inner perimeter surface of the bend-back piece 14b and the liquid reservoir wall 14d of the liquid return member 14, and rises up further along the perimeter wall section 11a between the liquid return member 14 and the next liquid return member 14. The seawater which reaches the liquid return member 14 of the next level in this way is impeded from rising up further by the liquid return member 14, and collects on the lower surface of the bend-back surface section 14a and the periphery of the bend-back piece 14b. When the collected liquid exceeds a certain amount, the liquid forms a droplet and drops down under its own weight. The droplets which drop down collect in the liquid reservoir section 14c of the lower level, and upon exceeding a certain amount, pass through the through hole 14e and drop down into the absorbing tower main body 11.

The gas flow rate is faster in the vicinity of the perimeter wall section 11a of the absorbing tower main body 11 than in the central portion of the absorbing tower main body 11, and therefore when the through hole 14e is provided in the vicinity of the perimeter wall section 11a, a situation may arise in which the droplets do not drop down from the through hole 14e due to the effects of the upward flow. Therefore, by providing the through hole 14e at a position distanced from the perimeter wall section 11a where the gas flow rate is faster than in the vicinity of the perimeter wall section 11a, the effects of the upward flow are weaker and it is possible to make the droplets drop down via the through hole 14e.

Since liquid return members 14 are provided in a plurality of levels in the up/down direction, the rising up of seawater is impeded a plurality of times by the liquid return members 14. Therefore, it is possible to effectively prevent situations where the seawater rises up and flows out from the opening section 11c of the absorbing tower main body 11.

Furthermore, although the liquid return members 14 are installed on the absorbing tower main body 11, since the liquid return members 14 have a shape which projects in a ring shape towards the central axis from the perimeter wall section 11a of the absorbing tower main body 11 and an opening section 14g is formed on the side of the central axis, then it is possible to reduce the pressure loss caused by the installation of the liquid return members 14. Furthermore, no blockages occur due to the liquid return members 14, and complex maintenance is not necessary.

The droplets that drop down are prevented from revolving by the baffle 15 which is disposed below the absorbing tower main body 11, and then pass along the baffle 15 and the perimeter wall section 11a, and collect in the collecting section which is constituted by the bottom wall section 11b and the perimeter wall section 11a peripheral to same, of the absorbing tower main body 11. The collected liquid is discharged to the outside of the absorbing tower main body 11 via the wastewater pipe 16.

Figure 3A:
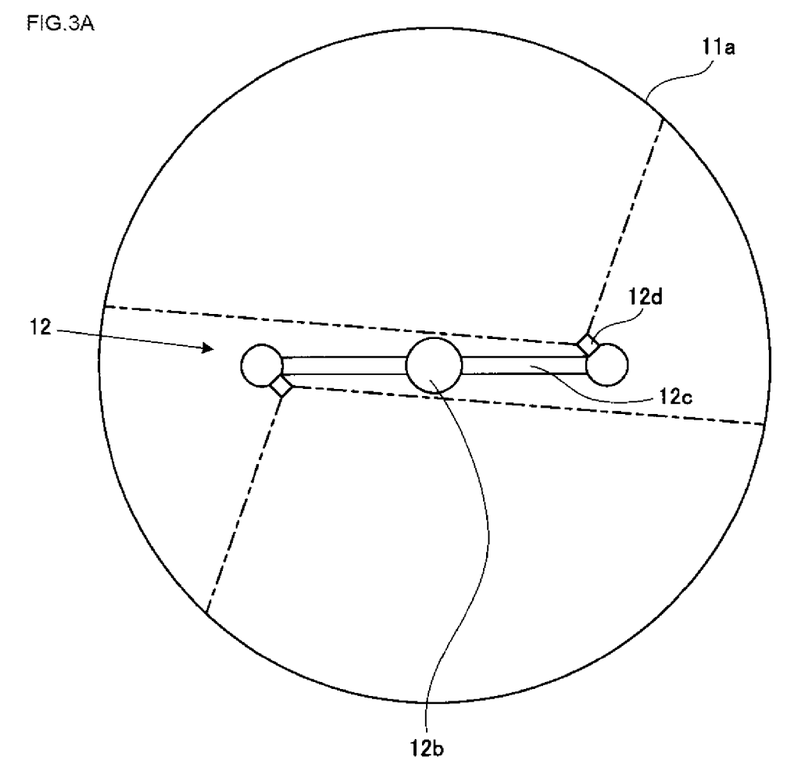
FIGS. 3A and 3B are illustrative diagrams showing a relationship between a branch pipe and a spray nozzle in a spray apparatus of the gas absorbing tower.
Figure 3B:
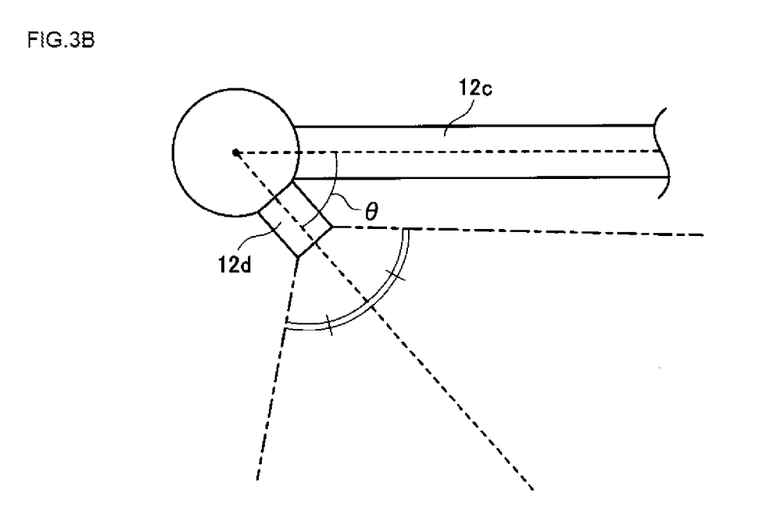
Figure 4A:
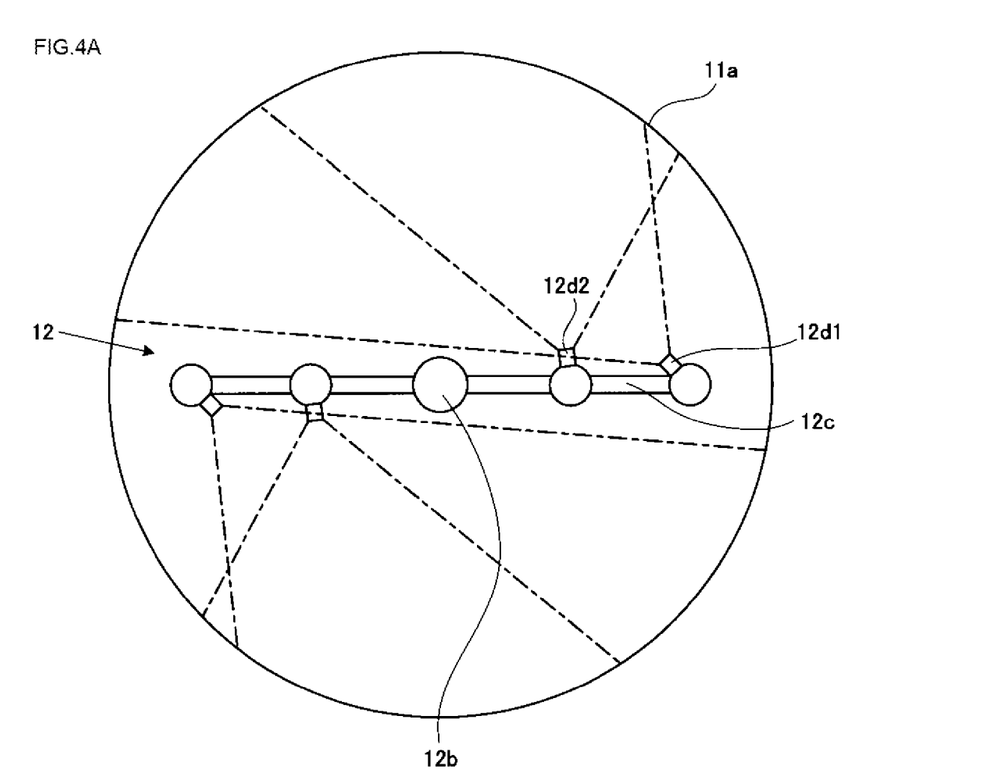
FIGS. 4A and 4B are illustrative diagrams showing a relationship between a branch pipe and a spray nozzle in a spray apparatus of the gas absorbing tower.
Figure 4B:
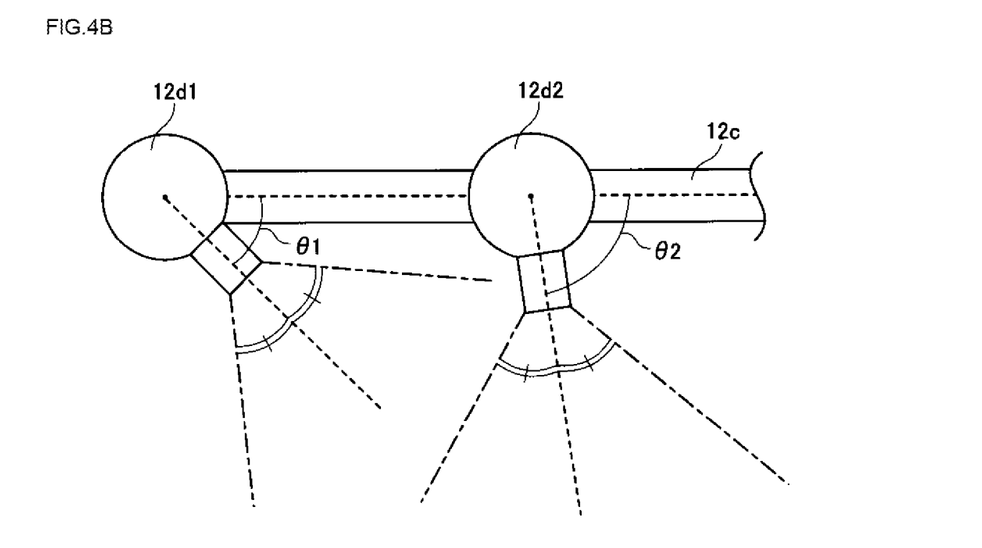

Next, the spray nozzle 12d of the spray apparatus 12 in the gas absorbing tower 10 will be described in detail. Firstly, the angle of installation of the spray nozzles 12d with respect to the branch pipes 12c is described with reference to the drawings. FIG. 3 and FIG. 4 are illustrative diagrams which show a relationship between the branch pipes 12c of the spray apparatus 12 in the gas absorbing tower 10 and the spray nozzles 12d. Furthermore, FIG. 3 and FIG. 4 represent the spray region of the spray nozzles 12d by single-dotted lines.

As shown in FIG. 3A, the spray nozzles 12d are installed such that the spray direction is inclined inwards with respect to the branch pipes 12c, in the same plane as the branch pipes 12c. More specifically, as shown in FIG. 3B, the spray nozzles 12d are installed in such a manner that the angle θ formed between the extension line of the center line of the spray region of the spray nozzles 12d, and the lengthwise direction, or longitudinal axis, of the branch pipes 12c, is an acute angle.

The angle θ is desirably set to be one half of the spray angle of the spray nozzles 12d, in such a manner that the droplets sprayed from the spray nozzles 12d do not strike the water conduit pipe 12b. This is in order to prevent deterioration of the water conduit pipe 12b that occurs when the droplets sprayed from the spray nozzles 12d strike the water conduit pipe 12b. For example, when the spray angle of the spray nozzles 12d is 90 degrees, then the angle θ is set to 45 degrees, and when the spray angle of the spray nozzles 12d is 120 degrees, then the angle θ is set to 60 degrees.

By arranging the spray nozzles 12d in this way so as to have an acute angle of installation θ, it is possible to lengthen the distance between the perimeter wall section 11a of the absorbing tower main body 11 and the spray ports of the spray nozzles 12d. Consequently, as shown in FIG. 3A, droplets are sprayed in a broad range including the central portion, in the horizontal cross-section of the absorbing tower main body 11. Therefore, it is possible to raise the contact surface area between the exhaust gas and the absorbing liquid, compared to a case where the spray nozzles 12d are disposed perpendicularly with respect to the branch pipes 12c (see FIG. 10).

Furthermore, by disposing the spray nozzles 12d in this way so as to have an acute angle of installation θ, the distance between the perimeter wall section 11a on the side in the direction of extension of the branch pipes 12c, and the spray ports of the spray nozzles 12d is longer than in a case where the spray nozzles 12d are arranged perpendicularly with respect to branch pipes 12c. Accordingly, the flight distance of the liquid droplets sprayed in this portion becomes longer, and hence the contact time between the exhaust gas and the absorbing liquid can be increased.

Consequently, by providing spray nozzles 12d at an acute angle with respect to the branch pipes 12c, it is possible to raise the contact properties between the exhaust gas and the absorbing liquid (principally, the contact surface area and the contact time), compared to cases where the spray nozzles 12d are provided perpendicularly with respect to the branch pipes 12c.

Furthermore, as shown in FIG. 4A, it is possible to provide a plurality of spray nozzles 12d (two spray nozzles 12d in FIG. 4A) on one branch pipe 12c. In FIG. 4A, a spray nozzle 12d1 and a spray nozzle 12d2 are provided respectively at the front end and near the center of each of the branch pipes 12c. The spray nozzle 12d1 and the spray nozzle 12d2 may each have the same angle of installation θ (θ1, θ2) with respect to the branch pipe 12c, or may have different angles of installation. By adjusting the angles of installation θ (θ1, θ2) of the two spray nozzles 12d1, 12d2, it is possible to spray droplets in a broader range, compared to when one spray nozzle 12d is provided on each branch pipe 12c.

It is also possible to adjust the angles of installation θ of the plurality of spray nozzles 12d, as appropriate. For example, when the angle of installation θ of at least one spray nozzle 12d, of the plurality of spray nozzles 12d, is an acute angle, then the angle of installation θ of the remaining spray nozzle 12d may be equal to or greater than 90 degrees. However, it is desirable to adopt the following mode in respect of the angle of installation θ of the plurality of spray nozzles 12d.

In other words, as shown in FIG. 4B, the angles of installation θ (θ1, θ2) of the two spray nozzles 12d1, 12d2 are desirably adjusted in such a manner that the angle θ1 formed between the line of extension of the center line of the spray region of the spray nozzle 12d1 and the lengthwise direction of the branch pipe 12c, and the angle θ2 formed between the line of extension of the center line of the spray region of the spray nozzle 12d1 and the lengthwise direction of the branch pipe 12c are both acute angles, and that θ1<θ2. By adjusting the angles in this way, even in cases where a plurality of spray nozzles 12d (12d1, 12d2) are provided on one branch pipe 12c, it is possible to spray the absorbing liquid in a broad range, while taking consideration to avoid the absorbing liquid sprayed from the spray nozzles 12d1, 12d2 striking the water conduit pipe 12b.

In this way, by adopting a composition in which a plurality of spray nozzles 12d are provided on one branch pipe 12c, it is possible to broaden the spraying region with respect to the internal space of the absorbing tower main body 11. Therefore, it is possible to raise yet further the contact properties between the exhaust gas and the absorbing liquid (principally, the contact surface area and the contact time), and the removal rate of the harmful substances is improved.

The spray nozzles 12d can be connected to the branch pipe 12c by joints such as elbow or straight elbow joints, which are common pipe junctions. For example, long nipples are used as the branch pipes 12c, elbows are screwed into either end thereof, straight elbows are screwed into these elbows, and spray nozzles 12d having a straight shape are provided on these straight elbows. Furthermore, when the spray nozzles 12d have a 90-degree bend section, it is also possible to connect the spray nozzles 12d directly to the elbows, without using the straight elbows.

It is possible to adopt a straight-shaped spray nozzle having any one of various spray patterns, such as a fan-shaped, full cone, or hollow cone pattern, for example, as the spray nozzle 12d. By adopting a spray nozzle 12d of this kind, it is also possible to adjust the angle of inclination with respect the horizontal plane, as well as the angle of installation within the horizontal plane. By adjusting the angle of inclination of the spray nozzles 12d, it is possible to cause the sprayed droplets to be directed upwards or downwards with respect to the horizontal plane. Consequently, the flight distance of the sprayed droplets is increased and the removal rate of the harmful substances is improved. The flight distance in this case indicates the distance travelled by the droplets sprayed from the spray ports of the spray nozzles 12d until reaching the perimeter wall section 11a of the absorbing tower main body 11.

When the gas absorbing tower 10 is employed as an exhaust gas processing apparatus in a ship, the absorbing tower main body 11 must be compact in size and the installation space thereof must be small. In order to make the absorbing tower main body 11 compact in size, it is necessary to improve the removal rate of harmful substances.

Furthermore, by decreasing the amount of the absorbing liquid sprayed from the spray nozzles 12d of the spray apparatus 12 in the gas absorption tower 10, in accordance with decrease in the load on the source of the exhaust gas, such as the engine 20 or boiler, it becomes possible to reduce the motive force required in the seawater pump unit 30. However, when the amount of absorbing liquid sprayed from the spray nozzles 12d decreases, then there is a risk of deterioration in the properties of the droplets sprayed from the spray nozzles 12d. For example, when fan-shaped nozzles are used as the spray nozzles 12d, then the discharge pressure declines as the flow rate of the absorbing liquid decreases, the absorbing liquid forms a liquid film at the spray port, and there is a risk that droplets will not be formed.

Figure 5:
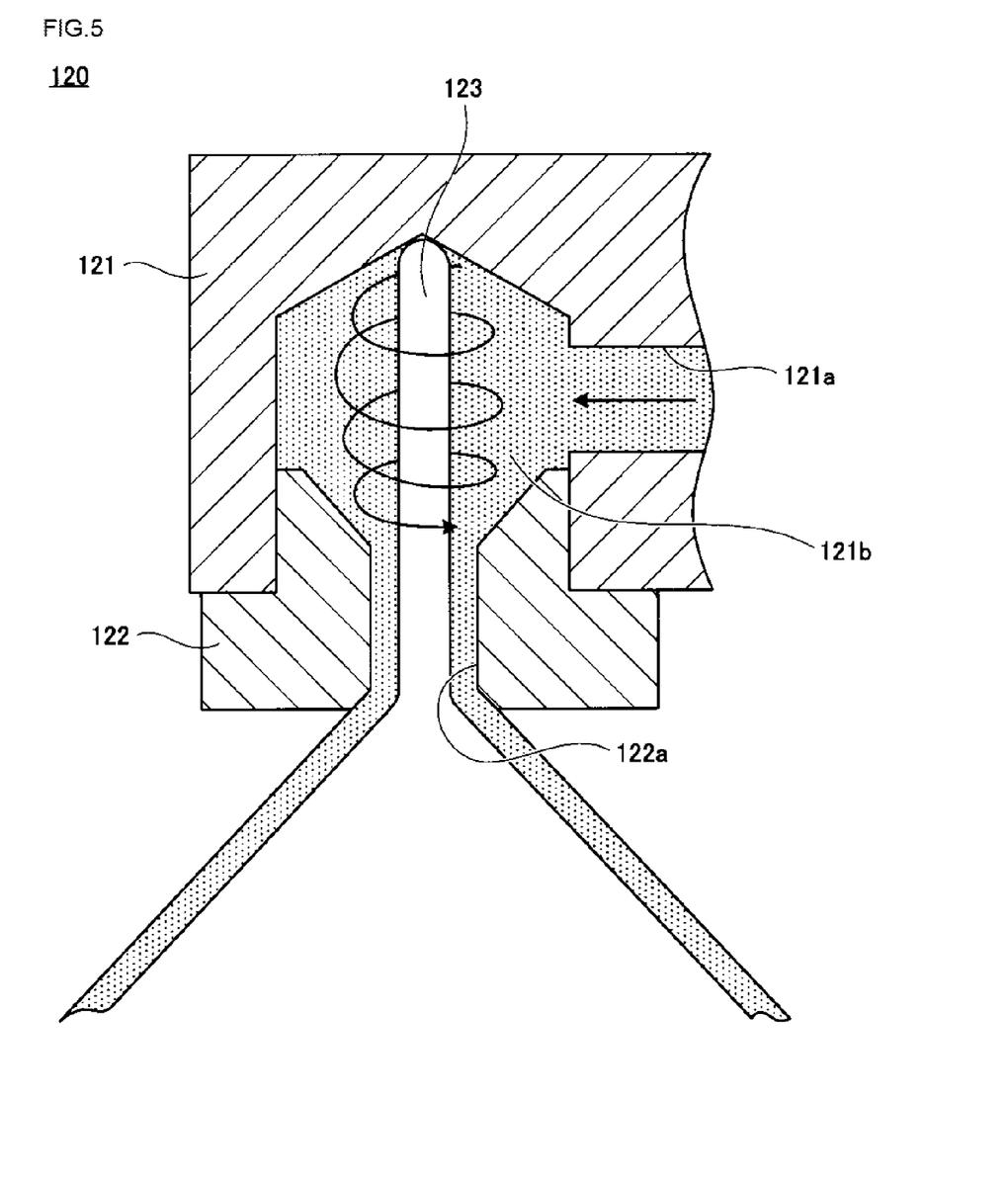
FIG. 5 is a cross-sectional schematic drawing showing one example of a hollow cone nozzle.
Figure 6:
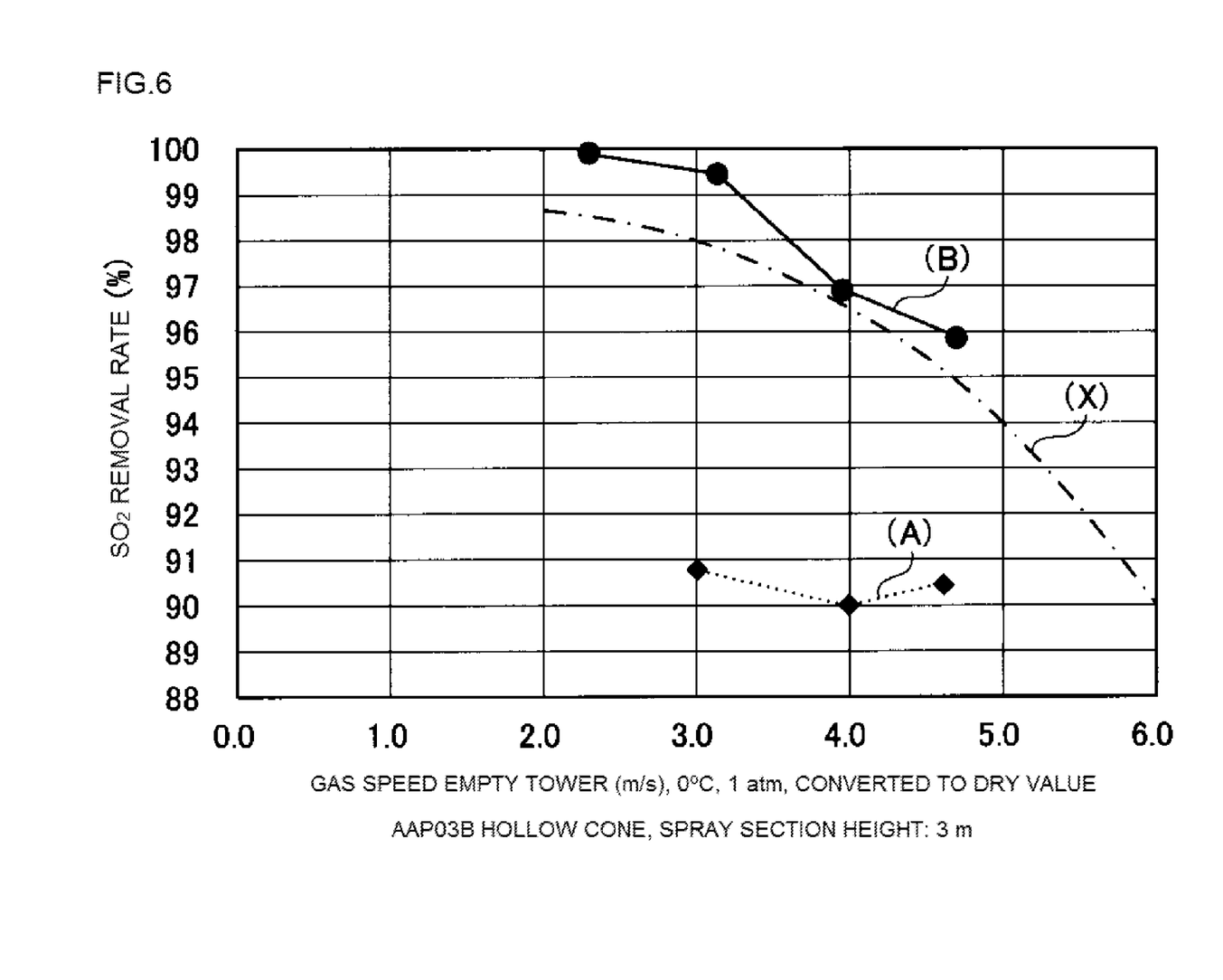
FIG. 6 is a graph showing the $SO_2$ removal rate in a case where the spray nozzles are installed at an angle of $\theta=90°$, and in a case where the spray nozzles are installed at an angle of $\theta=45°$, with respect to the branch pipe.
Figure 7A:
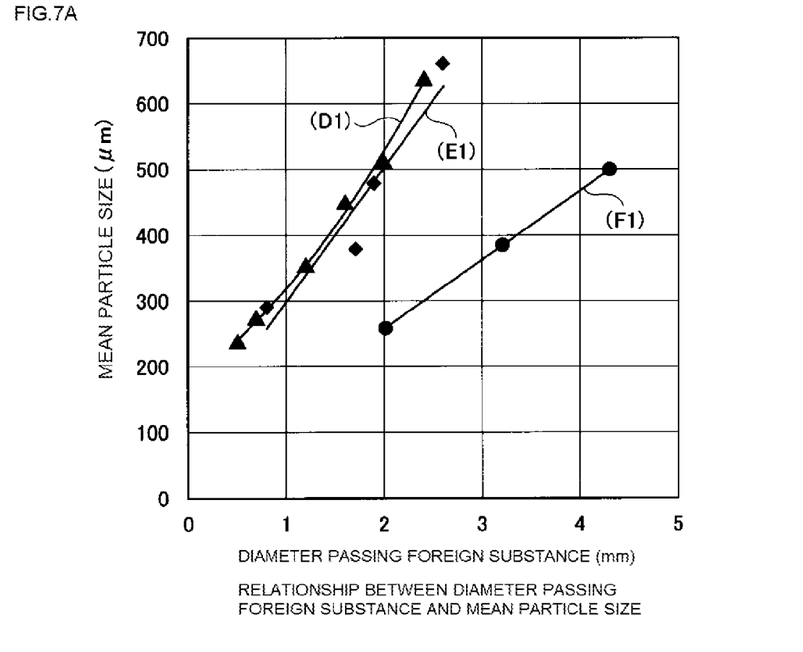
FIG. 7A is a graph showing the relationship between the diameter passing foreign substance in the spray nozzles and the mean particle size of the droplets.
Figure 7B:
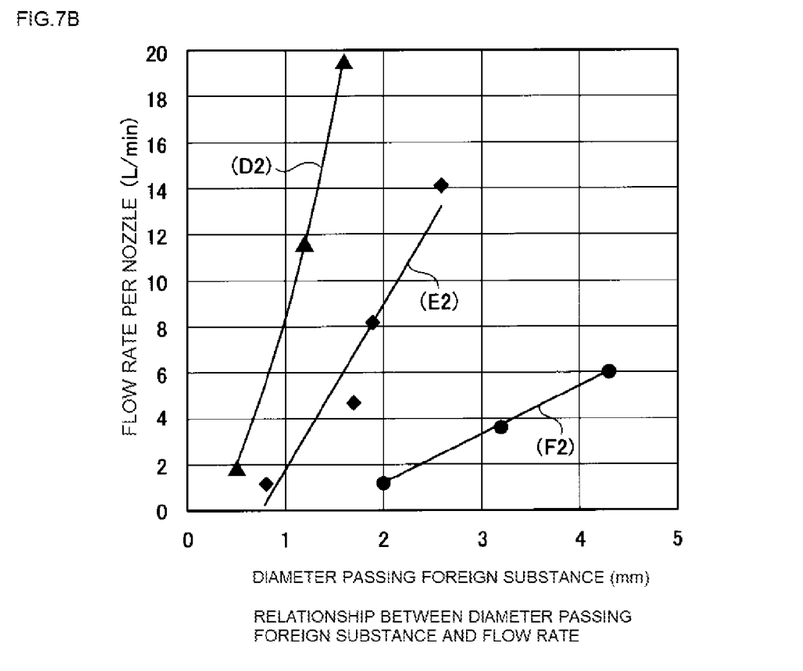
FIG. 7B is a graph showing the relationship between the diameter passing foreign substance in the spray nozzles and the flow rate per spray nozzle at a spray pressure of 0.3 MPa.

Therefore, desirably, the spray nozzles 12d use hollow cone nozzles 120 such as those shown in FIG. 5. FIG. 5 is a cross-sectional schematic drawing showing an example of a hollow cone nozzle 120. As shown in FIG. 5, the hollow cone nozzle 120 is composed by a nozzle main body 121 and a cap 122. The nozzle main body 121 includes an inflow hole 121a into which the absorbing liquid flows, and a revolving flow chamber 121b which is connected in substantially perpendicular fashion to the inflow hole 121a. A spray port 122a is provided in the cap 122. By installing the cap 122 on the nozzle main body 121, the revolving flow chamber 121b and the spray port 122a are provided in consecutive fashion in the perpendicular direction.

In the revolving flow chamber 121b, the absorbing liquid supplied from the inflow hole 121a to the revolving flow chamber 121b creates a revolving flow which revolves about the axis of the revolving flow chamber 121b. Consequently, an air core 123 is produced about the axis of the revolving flow chamber 121b, and the absorbing liquid sprayed from the spray port 122a forms a hollow cone shape.

When a hollow cone nozzle 120 is used for the spray nozzle 12d, then even when the absorbing liquid flow rate supplied to the spray nozzle 12d is reduced, since the absorbing liquid revolves in the revolving flow chamber 121b and is then sprayed, then a suitable form of the droplets can be maintained, rather than forming a liquid film at the spray port 122a.

Furthermore, since the air core 123 is situated inside the hollow cone nozzle 120, then the diameter passing foreign matter is structurally larger than with a fan-shaped nozzle or a full cone nozzle. Therefore, by using a hollow cone nozzle 120 for the spray nozzles 12d, it is possible to prevent blockages of the spray nozzles 12d caused by foreign substance in the seawater or alkali liquid, which is used as the absorbing liquid. Consequently, when a composition which filters the absorbing liquid with a strainer is adopted, in order to prevent blockage of foreign substance in the spray nozzles 12d, it is possible to adopt a coarser mesh for the strainer, and the pressure loss can be reduced and the maintenance frequency can also be reduced.

In a gas absorbing tower 10, in order to improve the removal rate of harmful substances, it is necessary to increase the contact properties (contact surface area and contact time) between the exhaust gas and the absorbing liquid. Here, in order to increase the contact surface area between the exhaust gas and the absorbing liquid, it is necessary to increase the contact surface area of the droplets. The method for increasing the surface area of the droplets may be: (1) a method which increases the flow rate of absorbing liquid supplied to the supply nozzles 12d; (2) a method which reduces the diameter of the droplets sprayed from the spray nozzles 12d; or (3) a method which lengthens the flight time of the droplets sprayed from the spray port of the spray nozzles 12d to the perimeter wall section 11a; or the like.

(1) In a method which increases the flow rate of absorbing liquid supplied to the spray nozzles 12d, the flow rate of the absorbing liquid is determined by the flow rate of harmful substances ($SO_x$) supplied to inside the absorbing tower main body 11. In other words, the absorbing liquid flow rate is determined by applying a uniform safety ratio to the equivalent chemical amount required to absorb the $SO_x$. The safety ratio is no less than 1.01 and no more than 1.5, and desirably, 1.2.

(2) In a method which reduces the diameter of the droplets sprayed from the spray nozzles 12d, generally, in order to make droplets finer in size, the flow rate of the absorbing liquid which is supplied to the spray nozzles 12d needs to be reduced, and the discharge pressure needs to be increased. When the flow rate of the absorbing liquid supplied to each spray nozzle 12d is reduced, then it is necessary to increase the number of spray nozzles 12d provided in the whole of the gas absorbing tower 10, which consequently leads to a larger size of the gas absorbing tower 10 and increased costs. Furthermore, when the discharge pressure is raised, the motive force of the pump for discharging absorbing liquid is increased, which leads to increase in the pump capacity and higher power consumption.

Therefore, when the same conditions are set for the absorbing liquid flow rate and the discharge pressure supplied to the spray nozzles 12d, then it is necessary to select nozzles which produce the smallest droplet diameter. Here, when the same conditions are set for the absorbing liquid flow rate and the discharge pressure supplied to the spray nozzles 12*d*, then the hollow cone nozzle yields the smallest diameter of the sprayed droplets, compared to the fan-shaped nozzle and the full cone nozzle. Consequently, by using a hollow cone nozzle for the spray nozzles 12*d*, it is possible to reduce the diameter of the droplets sprayed from the spray nozzles 12*d*, in other words, it is possible to increase the surface area of the droplets and hence to raise the removal rate of harmful substances.

(3) In a method which increases the flight time of the droplets sprayed from the spray ports of the spray nozzles 12*d* until reaching the perimeter wall section 11*a*, the flight distance of the droplets can be lengthened by adjusting the angle of inclination of the spray nozzles 12*d* in such a manner that the sprayed droplets are directed upwards or downwards with respect to the horizontal surface. By this means, it is possible to lengthen the flight time of the droplets sprayed from the spray ports of the spray nozzles 12*d*, until reaching the perimeter wall section 11*a*.

As described above, according to the gas absorbing tower 10 relating to the present embodiment, since the spray nozzles 12*d* are installed in such a manner that the angle of inclination θ formed between the center line of the spray region of the spray nozzles 12*d* and the branch pipes 12*c* in the lengthwise direction of the branch pipes 12*c* is an acute angle, then the distance between the perimeter wall section 11*a* of the absorbing tower main body 11 and the spray port of the spray nozzles 12*d* can be lengthened. Therefore, it is possible to increase the contact surface area between the exhaust gas and the absorbing liquid, since the droplets are sprayed in a broad range including the central portion, in the horizontal cross-section of the absorbing tower main body 11. Furthermore, by lengthening the distance between the perimeter wall section 11*a* of the absorbing tower main body 11 and the spray ports of the spray nozzles 12*d*, the flight distance of the droplets is extended, and the contact time between the exhaust gas and the absorbing liquid can be increased.

In this way, the contact properties between the exhaust gas and the absorbing liquid (principally, the contact surface area and the contact time) can be raised, and therefore the efficiency of the removal of harmful substrates by each spray nozzle 12*d* is increased, and the number of spray nozzles 12*d* that need to be provided in order to achieve the desired removal rate in the gas absorbing tower 10 is reduced. Since the number of branch pipes 12*c* that need to be installed on the water conduit pipe 12*b* (trunk pipe) is also reduced in accordance with the reduction in the number of installed spray nozzles 12*d*, then the length of the water conduit pipe 12*b* can also be shortened. Consequently, it is possible to restrict the height of the absorbing tower main body 11 required to accommodate the water conduit pipe 12*b*, and therefore it is possible to make the accommodating tower main body 11 compact in size.

According to the gas absorbing tower 10 relating to the present embodiment, the height of the absorbing tower main body 11 is restricted and it is possible to dispose the gas absorbing tower 10 in the engine room or the deck of the ship, and therefore the installation properties of the gas absorbing tower 10 acting as an exhaust gas processing apparatus is improved.

Furthermore, since the number of members used can be reduced, in accordance with the more compact size of the gas absorbing tower 10, then it is possible to reduce the price of the gas absorbing tower 10. Moreover, by using a hollow cone nozzle for the spray nozzles 12*d*, it is possible to reduce the pump power and the maintenance costs, and therefore further price reduction can be achieved.

First Example

FIGS. 6A and 6B are graphs showing the $SO_2$ removal rate in a case where (A) the spray nozzles are installed at an angle of θ=90°, and (B) the spray nozzles are installed at an angle of θ=45°, with respect to the branch pipe. In FIG. 6, the vertical axis represents the $SO_2$ removal rate (%) and the horizontal axis represents the gas flow rate (m/s). Furthermore, the graph (X) shows the target line of the $SO_2$ removal rate.

FIG. 6 shows a graph for a case where branch pipes are provided at a pitch of 90 mm on the water conduit pipe, and 64 spray nozzles are provided. Furthermore, seawater is supplied as an absorbing liquid at a rate of 190 liters per minute to the spray nozzles in graph (A), and seawater is supplied as an absorbing liquid at a rate of 180 liters per minute to the spray nozzles in graph (B).

When spray nozzles are provided at an angle of θ=90° with respect to the branch pipes, then it is not possible to exceed the target line (X), whatever the gas flow rate (see graph (A)). On the other hand, when the spray nozzles are provided at an angle of θ=45° with respect to the branch pipes, then the target line (X) is exceeded, at all values of the gas flow rate (see graph (B)).

As a result of this, by providing the spray nozzles at an acute angle with respect to the branch pipes, it can be seen that the removal rate of the harmful substances is improved, and target performance is obtained, compared to a case where the spray nozzles are provided perpendicularly to the branch pipes.

Second Example

FIG. 7A is a graph showing the relationship between the diameter passing foreign substance in the spray nozzles and the mean particle size of the droplets, and FIG. 7B is a graph showing the relationship between the diameter passing foreign substance in the spray nozzles and the flow rate per spray nozzle at a spray pressure of 0.3 MPa. In FIG. 7A, the vertical axis represents the mean particle size (μm) and the horizontal axis represents the diameter passing foreign substance (mm). In FIG. 7B, the vertical axis represents the flow rate (L/min) and the horizontal axis represents the diameter passing foreign substance (mm).

In FIG. 7A, the graph (D1) represents a case where a fan-shaped nozzle is used for the spray nozzles, the graph (E1) represents a case where a full cone nozzle is used for the spray nozzles, and the graph (F1) represents a case where a hollow cone nozzle is used for the spray nozzles. In FIG. 7B, the graph (D2) represents a case where a fan-shaped nozzle is used for the spray nozzles, the graph (E2) represents a case where a full cone nozzle is used for the spray nozzles, and the graph (F2) represents a case where a hollow cone nozzle is used for the spray nozzles.

As shown in FIG. 7A, it can be seen that, at the same mean particle size, the diameter passing foreign substance is largest in the case of the hollow cone nozzle and therefore this form has the lowest risk of blocking of the nozzle. As shown in FIG. 7B, it can be seen that, at the same flow rate conditions, the diameter passing foreign substance is largest in the case of the hollow cone nozzle and therefore this form has the lowest risk of blocking of the nozzle.

From these results, it can be seen that when a hollow cone nozzle is used for the spray nozzles, it is possible to increase the diameter passing foreign substance, and therefore the risk of the nozzle being closed off by foreign substance can be reduced.

Third Example

Figure 8:
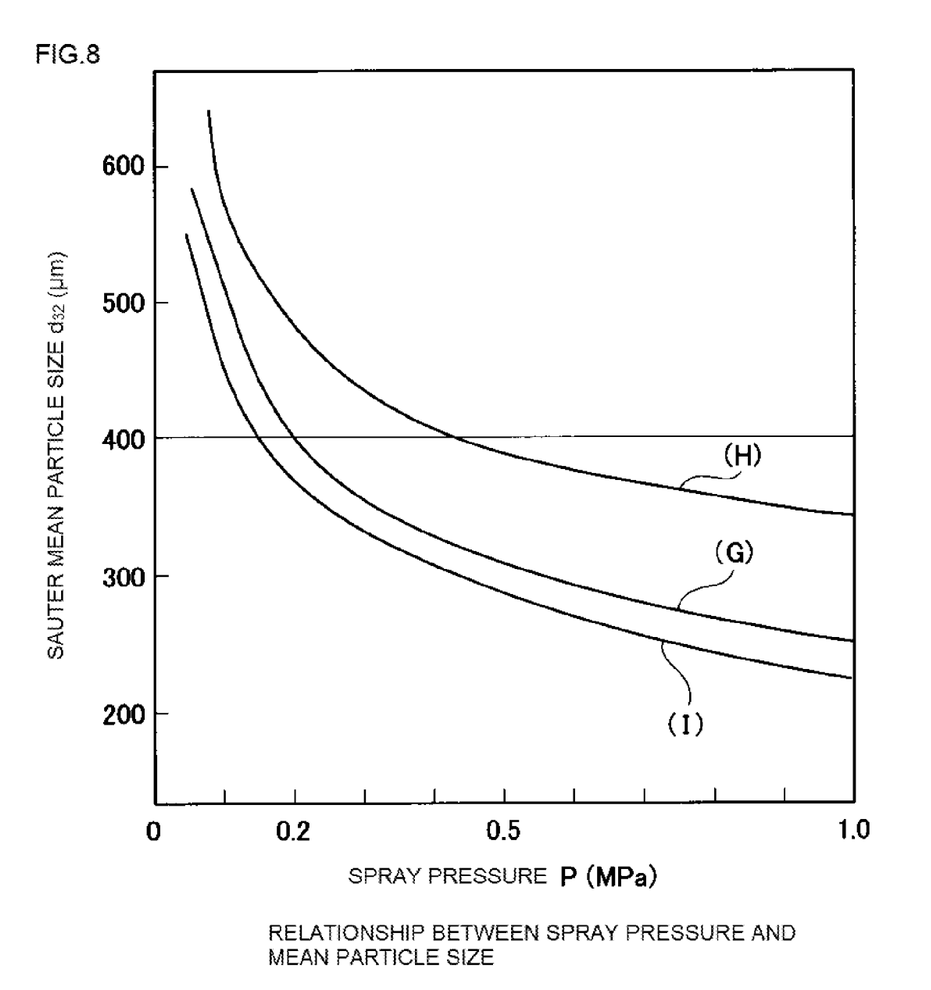
FIG. 8 is a graph showing a relationship between the spray pressure of the spray nozzle and the mean particle size of the droplets.

FIG. 8 is a graph showing a relationship between the spray pressure of the spray nozzle and the mean particle size of the droplets. In FIG. 8, the vertical axis represents the Sauter mean particle size $d_{32}$ (μm) and the horizontal axis represents the spray pressure P (MPa). Furthermore, in FIG. 8, the graph (G) represents a case where a fan-shaped nozzle is used for the spray nozzles, the graph (H) represents a case where a full cone nozzle is used for the spray nozzles, and the graph (I) represents a case where a hollow cone nozzle is used for the spray nozzles.

As shown in FIG. 8, it can be seen that, at the same spray pressure and spray flow rate, the mean particle diameter of the hollow cone nozzle is small.

From these results, it can be seen that when a hollow cone nozzle is used for the spray nozzles, the diameter of the droplets sprayed from the spray nozzles can be made smaller, and therefore the removal rate of harmful substances can be raised, due to the increased surface area where the exhaust gas and the absorbing liquid make contact with each other.

Fourth Example

Figure 9:
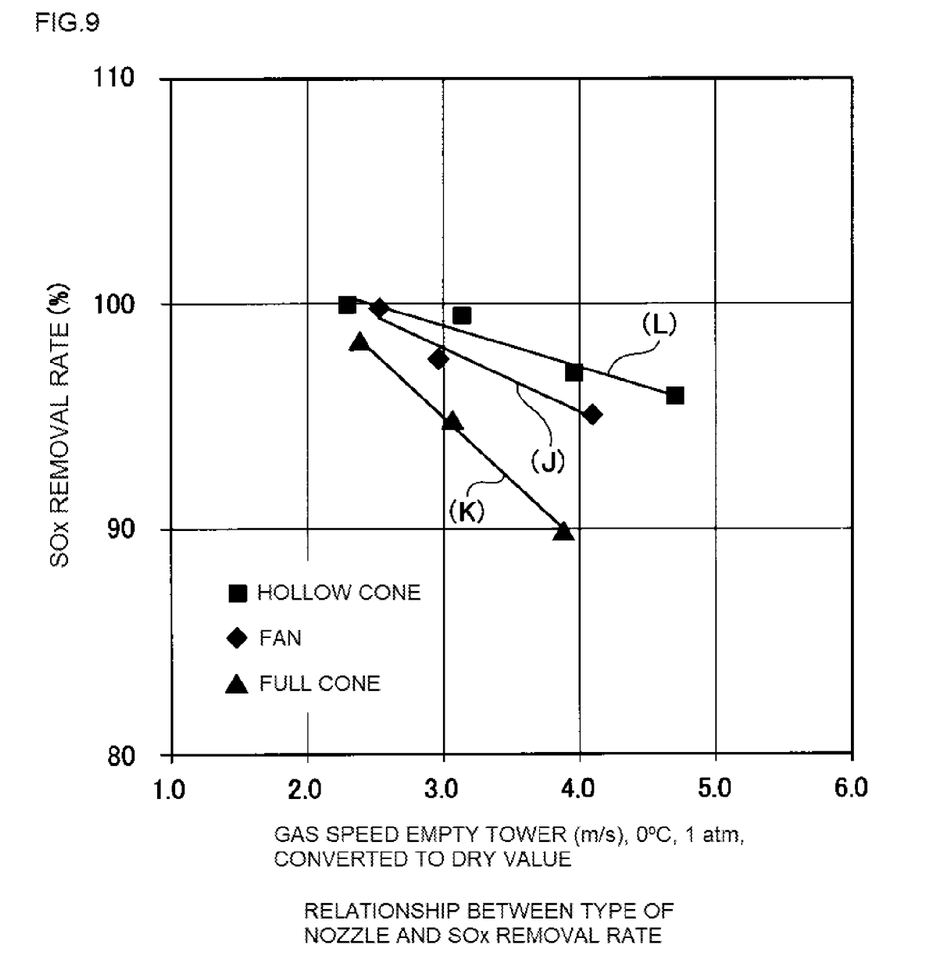
FIG. 9 is a graph showing a relationship between the type of the spray nozzle and the $SO_x$ removal rate.

FIG. 9 is a graph showing a relationship between the type of the spray nozzle and the $SO_x$ removal rate. In FIG. 9, the vertical axis represents the $SO_x$ removal rate (%) and the horizontal axis represents the gas flow rate (m/s). Furthermore, in FIG. 9, the graph (J) represents a case where a fan-shaped nozzle is used for the spray nozzles, the graph (K) represents a case where a full cone nozzle is used for the spray nozzles, and the graph (L) represents a case where a hollow cone nozzle is used for the spray nozzles.

As shown in FIG. 9, it can be seen that, when the same experimental conditions are set for each nozzle, the SOx removal rate is highest in the case of the hollow cone nozzle.

From these results, it can be seen that, when a hollow cone nozzle is used for the spray nozzles, the SOx removal rate of the gas absorbing tower can be improved.

The present invention is not limited to the embodiments described above, and can be implemented with various modifications. In the embodiments described above, the invention is not limited to the sizes and shapes, and the like, depicted in the accompanying drawings, and suitable modifications are possible within a range that exhibits the beneficial effects of the present invention. Apart from this, it is also possible to implement the invention by making suitable modifications, without departing from the object of the invention.

The present application is based on Japanese Patent Application No. 2012-276654 filed on 19 Dec. 2012, the contents of which are incorporated herein in their entirety.

The invention claimed is:

1. An exhaust gas processing apparatus for removing substances from exhaust gas, the apparatus comprising:
an absorbing tower main body forming an internal space;
a spray apparatus, disposed on a central axis of the absorbing tower main body, for spraying liquid in a prescribed region within the internal space; and
a gas supply apparatus for introducing the gas into the absorbing tower main body at a position below the region where the spray apparatus is configured to spray the liquid, such that a gas rises up inside the absorbing tower main body while revolving, so as to follow a perimeter wall section of the absorbing tower main body,
the spray apparatus including:
a trunk pipe extending in at least one of the upward or downward directions in the internal space;
branch pipes coupled to the trunk pipe and extending towards an inner wall of the absorbing tower main body, the branch pipes communicating the liquid; and
spray nozzles receiving the liquid from the branch pipes and spraying the liquid so that the liquid makes contact with the gas to purify the gas,
the spray nozzles being inclined inwards and disposed such that an angle of installation formed between a center line of a spraying region of the spray nozzles and a longitudinal axis of the branch pipes is an acute angle.

2. The exhaust gas processing apparatus according to claim 1, wherein the spray nozzles spray the liquid in a horizontal direction.

3. The exhaust gas processing apparatus according to claim 1, wherein the angle is formed so that the trunk pipe is not included within the spraying region.

4. The exhaust gas processing apparatus according to claim 1, wherein the angle is one half of a total spraying angle of the spray region of the spray nozzles.

5. The exhaust gas processing apparatus according to claim 1, wherein
each of the branch pipes has a plurality of the spray nozzles disposed thereon, and
an angle of installation of at least one spray nozzle of the plurality of spray nozzles is an acute angle.

6. The exhaust gas processing apparatus according to claim 5,
wherein the spray nozzles include first and second spray nozzles on a same one branch pipe of the branch pipes, the first spray nozzle being on an outer side in a radial direction of the exhaust gas processing apparatus relative to the second nozzle,
wherein a first angle of installation of the first spray nozzle relative to the one branch pipe is smaller than a second angle of installation of the second spray nozzle relative to the one branch pipe,
the first angle of installation being formed between a center line of a first spraying region of the first spray nozzle, and a longitudinal axis of one the branch pipe,
the second angle of installation being formed between a center line of a second spraying region of the second spray nozzle, and the longitudinal axis of the one branch pipe.

7. The exhaust gas processing apparatus according to claim 1, wherein
each of the branch pipes has a plurality of the spray nozzles disposed thereupon, and angles of installation of the spray nozzles with respect to the branch pipes are respectively different,
the angles of installation being formed between center lines of spraying regions of said plurality of spray nozzles, and longitudinal axes of the branch pipes.

8. The exhaust gas processing apparatus according to claim 1, wherein the spray nozzles spray upwards or downwards.

9. The exhaust gas processing apparatus according to claim 1, wherein the spray nozzles are hollow cone nozzles.

10. The exhaust gas processing apparatus according to claim 1, wherein the spray nozzles each have
an inflow hole through which the liquid flows into the spray nozzle, and
a revolving flow chamber connected perpendicularly to the inflow hole so that an axis of the revolving flow chamber extends in a direction perpendicular to that of the inflow hole, the revolving flow chamber receiving the liquid from the inflow hole to cause the liquid to revolve in the revolving flow chamber, and the revolving flow chamber spraying the liquid.

11. The exhaust gas processing apparatus according to claim 1, wherein
the gas supply apparatus is disposed so as to introduce the gas into the absorbing tower main body from a position below the region where the spray apparatus sprays the liquid, and
the gas rises up through an interior of the absorbing tower main body while revolving so as to follow a surface of the inner wall of the absorbing tower main body.

12. The exhaust gas processing apparatus according to claim 11, wherein a spraying direction of the spray nozzles is inclined towards a central axis of rotation of the gas.

13. The exhaust gas processing apparatus according to claim 12, wherein the absorbing tower main body further comprises
a liquid return member which is disposed in a position above the region where the spray apparatus sprays the liquid,
the liquid return member projecting in a ring shape from the surface of the inner wall of the absorbing tower main body towards a central axis of the absorbing tower main body, and
a front end of the liquid return member on a central axis side is bent at least downwards.

14. The exhaust gas processing apparatus according to claim 13, wherein the liquid return member includes:
a liquid reservoir wall which projects to an upper side so as to form a liquid reservoir section; and
a through hole which allows liquid collected in the liquid reservoir section to drop.

15. An exhaust gas processing apparatus for removing substances from the gas, the apparatus comprising:
an absorbing tower main body forming an internal space;
a spray apparatus, disposed on a central axis of the absorbing tower main body, for spraying liquid in a prescribed region within the internal space; and
a gas supply apparatus for introducing the gas into the absorbing tower main body at a position below the region where the spray apparatus is configured to spray the liquid, such that a gas rises up inside the absorbing tower main body while revolving, so as to follow a perimeter wall section of the absorbing tower main body,
the spray apparatus including:
a trunk pipe extending in at least one of the upward or downward directions in the internal space;
branch pipes coupled to the trunk pipe and extending towards an inner wall of the absorbing tower main body, the branch pipes communicating the liquid; and
spray nozzles receiving the liquid from the branch pipes and spraying the liquid so that the liquid makes contact with the gas to purify the gas,
the spray nozzles being inclined inwards and disposed so as to be inclined further toward an inner side than a plane which is perpendicular to a lengthwise direction of the branch pipe.

16. The exhaust gas processing apparatus according to claim 15, wherein the plane is positioned further towards the inner wall than the spray nozzles.

17. An exhaust gas processing apparatus for removing substances from the gas, the apparatus comprising:
an absorbing tower main body forming an internal space;
a spray apparatus, disposed on a central axis of the absorbing tower main body, spraying liquid in a prescribed region within the internal space; and
a gas supply apparatus for introducing the gas into the absorbing tower main body at a position below the region where the spray apparatus is configured to spray the liquid, such that a gas rises up inside the absorbing tower main body while revolving, so as to follow a perimeter wall section of the absorbing tower main body,
the spray apparatus including:
branch pipes supplying the liquid; and
spray nozzles spraying the liquid supplied from the branch pipes so that the liquid makes contact with the gas to purify the gas,
the spray nozzles being inclined inwards and disposed such that an angle of installation formed between a center line of a spray region of the spray nozzles and a longitudinal axis of the branch pipes is an acute angle.

18. The exhaust gas processing apparatus according to claim 1, wherein the apparatus is employed as an exhaust gas processing apparatus in a ship.

19. The exhaust gas processing apparatus according to claim 15, wherein the apparatus is employed as an exhaust gas processing apparatus in a ship.

20. The exhaust gas processing apparatus according to claim 17, wherein the apparatus is employed as an exhaust gas processing apparatus in a ship.

* * * * *